(12) United States Patent
Yuanzhu (10) Patent No.: US 8,358,235 B2
(45) Date of Patent: Jan. 22, 2013

(54) WIRELESS SENSOR DEVICE

(75) Inventor: Dou Yuanzhu, Miyagi-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 92 days.

(21) Appl. No.: 12/875,864

(22) Filed: Sep. 3, 2010

(65) Prior Publication Data

US 2011/0057829 A1      Mar. 10, 2011

(30) Foreign Application Priority Data

Sep. 7, 2009   (JP) ................................ 2009-205994

(51) Int. Cl.
*G01S 13/32* (2006.01)

(52) U.S. Cl. ............ 342/28; 342/87; 342/100; 342/114; 342/127; 342/129

(58) Field of Classification Search ............... 342/27, 342/28, 87, 100, 114, 127–129, 175
See application file for complete search history.

(56) References Cited

U.S. PATENT DOCUMENTS

| | | | | |
|---|---|---|---|---|
| 4,142,189 A | * | 2/1979 | Gleason | 342/109 |
| 4,259,631 A | * | 3/1981 | Volkmann | 324/616 |
| 4,907,000 A | * | 3/1990 | Tabourier | 342/84 |
| 5,268,692 A | | 12/1993 | Grosch et al. | |
| 5,440,311 A | * | 8/1995 | Gallagher et al. | 342/132 |
| 5,559,828 A | * | 9/1996 | Armstrong et al. | 375/130 |
| 7,259,713 B1 | * | 8/2007 | Matich et al. | 342/145 |
| 7,272,164 B2 | | 9/2007 | Sorrells et al. | 375/147 |
| 7,894,789 B2 | * | 2/2011 | Sorrells et al. | 455/313 |
| 2003/0052813 A1 | | 3/2003 | Natsume | |

FOREIGN PATENT DOCUMENTS

| | | |
|---|---|---|
| DE | 196 51 540 | 6/1997 |
| EP | 0 348 036 A2 | 12/1989 |
| EP | 0 913 705 A2 | 5/1999 |
| EP | 1 239 299 A2 | 9/2002 |
| JP | 58 072077 A | 4/1983 |
| JP | 06-273504 | 9/1994 |
| JP | 2005-091365 | 4/2005 |
| JP | 2007-047047 | 2/2007 |
| JP | 2011058836 A * | 3/2011 |

OTHER PUBLICATIONS

Chin-Yu Lin; Chun-Yu Chiang; Tai-Cheng Lee; , "An offset phase-locked loop spread spectrum clock generator for SATA III," Custom Integrated Circuits Conference (CICC), 2010 IEEE , vol., no., pp. 1-4, Sep. 19-22, 2010.*

Extended European Search Report issued in corresponding European Patent Application No. 10175423.2, mailed Dec. 17, 2010.

Office Action issued in corresponding European Patent Application No. 10175423.2, mailed Jun. 14, 2012.

* cited by examiner

*Primary Examiner* — John B Sotomayor
(74) *Attorney, Agent, or Firm* — Brinks Hofer Gilson & Lione (57) ABSTRACT

A wireless sensor device includes a transmission signal generation unit that generates a frequency-spread high frequency transmission signal such that a transmission frequency is continuously increased and decreased with a predetermined period, a transmitter antenna that radiates the high frequency transmission signal, a receiver antenna that receives a reflected wave from an object having received the high frequency transmission signal, and outputs a frequency-spread high frequency reception signal, a mixer circuit that receives a part of the high frequency transmission signal as a first frequency-spread high frequency signal, receives the high frequency reception signal as a second frequency-spread high frequency signal, and outputs a DC beat signal by operating as a phase detector when frequencies of the first and second signals coincide with each other, and a DC component extraction circuit that extracts the DC beat signal from an output signal of the mixer circuit.

10 Claims, 6 Drawing Sheets

WIRELESS SENSOR DEVICE

CROSS REFERENCE TO RELATED APPLICATION

The present disclosure contains subject matter related to and claims priority to Japanese Patent Application JP 2009-205994 filed in the Japanese Patent Office on Sep. 7, 2009, the entire contents of which is hereby incorporated herein by reference.

BACKGROUND

1. Technical Field

The present disclosure relates to a wireless sensor device for detecting the motion of an object or a distance to the object by using a radio wave.

2. Related Art

A motion sensor or a distance detection sensor (hereinafter, referred to as a sensor device) is known for detecting the motion of an object or a distance to the object, which radiates a radio wave by supplying an antenna with a high frequency signal output from an oscillation circuit, receives a reflected wave from the object to convert the reflected wave into an electrical reception signal, and analyzes the reception signal (for example, refer to Japanese Unexamined Patent Application Publication No. 11-182109). The sensor device uses the principle (Doppler effect) that if a radio wave hits an object, the frequency of a reflected wave is slightly deviated from the frequency of the radiated wave, thereby measuring the motion or speed of the object from the size of the deviation (Doppler shift). Furthermore, since a radio wave is transmitted at the velocity of light through the air, the sensor device can measure the distance to the object from the delay amount (phase variation) of the reflected wave.

Figure 6:
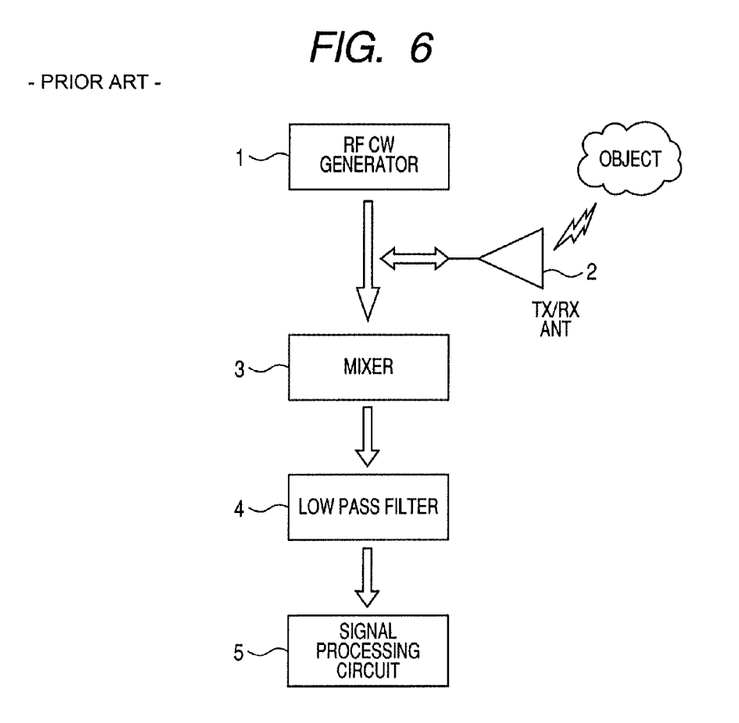
FIG. 6 is a diagram showing the principle of a Doppler radar.

FIG. 6 is a diagram illustrating the principle (one example) of a Doppler radar. An RF generator 1 outputs a transmission signal including a continuous wave of a predetermined frequency, and a transceiver antenna 2 receives the transmission signal to radiate a radio wave. The transceiver antenna 2 receives a reflected wave from an object. A mixer 3 receives a part of the transmission signal and the reception signal to mix them. At this time, when the object is moving, the frequency of the reception signal is shifted from the frequency of the transmission signal by the Doppler phenomenon. The mixer 3 detects the difference between the frequency of the transmission signal and the frequency of the reception signal as an intermediate frequency (IF). That is, if the object is moving, since the frequency of the reflected wave changes, the mixer 3 outputs an IF signal corresponding to the Doppler shift. If the object is in a stationary state, since the frequency of the reflected wave does not change, the mixer 3 outputs only a DC signal. The IF signal and the DC signal are extracted from the output signal of the mixer 3 through a low-pass filter (LPF) 4, and are analyzed by a signal processing circuit 5, so that it is possible to determine the presence or absence of the motion of the object. Furthermore, a pulse Doppler radar or a digital modulation Doppler radar measures a delay time of a radio wave, which has reciprocated between an object and the pulse Doppler radar or the digital modulation Doppler radar, from a transmission time of a transmission signal and a reception time of a reflected wave, thereby detecting a distance to the object from the delay time.

The wireless sensor device mainly employs an object in a short distance (e.g., a distance smaller than several tens of m) as an object to be measured. However, the use of a part of a frequency band allocated to other wireless communication systems may be assumed. At the present time, a wireless communication system having a relatively narrow service area includes a wireless LAN, a WiMAX and the like.

SUMMARY

According to a first aspect of the disclosure, there is provided a wireless sensor device including: a transmission signal generation unit configured to generate a frequency-spread high frequency transmission signal such that a transmission frequency is continuously increased and decreased with a predetermined period; a transmitter antenna configured to radiate the high frequency transmission signal generated by the transmission signal generation unit; a receiver antenna configured to receive a reflected wave from an object having received the high frequency transmission signal radiated from the transmitter antenna, and output a frequency-spread high frequency reception signal; a mixer circuit configured to receive a part of the high frequency transmission signal, which is input to the transmitter antenna, as a first frequency-spread high frequency signal, receive the high frequency reception signal, which is output from the receiver antenna, as a second frequency-spread high frequency signal, and output a DC beat signal by operating as a phase detector when a frequency of the first frequency-spread high frequency signal coincides with a frequency of the second frequency-spread high frequency signal; and a DC component extraction circuit configured to extract the DC beat signal from an output signal of the mixer circuit.

With such a configuration, the frequency-spread high frequency transmission signal such that the transmission frequency is continuously increased and decreased with the predetermined period is radiated from the transmitter antenna, the reflected wave from the object is received in the receiver antenna, and the first frequency-spread high frequency signal serving as the high frequency transmission signal and the second frequency-spread high frequency signal serving as the high frequency reception signal are input to the mixer circuit. The DC beat signal which is output from the mixer circuit having operated as the phase detector when the frequency of the first frequency-spread high frequency signal coincides with the frequency of the second frequency-spread high frequency signal is extracted by the DC component extraction circuit. As described above, if a synthesis component of the high frequency transmission signal and the high frequency reception signal is detected at the point at which the high frequency transmission signal intersects the high frequency reception signal, it may be possible to detect a residual phase including information regarding reciprocal delay (reciprocal distance) of the signal reciprocating between the wireless sensor device and the object. When variation in the position of the object occurs, the residual phase also changes, resulting in the detection of the motion of the object from the detected residual phase. Furthermore, since the frequency-spread high frequency transmission signal such that the transmission frequency is continuously increased and decreased with the predetermined period reliably intersects the high frequency reception signal, it may be possible to easily detect the residual phase including the information regarding the reciprocal delay (the reciprocal distance) of the signal. In addition, since the high frequency transmission signal is spread over the frequency such that the transmission frequency thereof is continuously increased and decreased with the predetermined period, wireless communication may be performed while reducing the influence on existing communication systems which employ a frequency band of a high frequency transmission signal as a band to be used.

DESCRIPTION OF EXEMPLARY EMBODIMENTS

A wireless sensor device in accordance with an embodiment radiates a high frequency transmission signal with a frequency spread after being changed in a chopping wave shape from an antenna, receives a reflected wave from an object through the antenna, outputs a frequency-spread high frequency reception signal, mixes the frequency-spread high frequency transmission signal in the chopping wave shape with the high frequency reception signal through a mixer, and extracts a DC component (a DC beat) output when the frequencies of the two signals coincide with each other, thereby detecting a distance to the object and the motion of the object.

Hereinafter, the embodiment will be described in detail with reference to the accompanying drawings.

Figure 1:
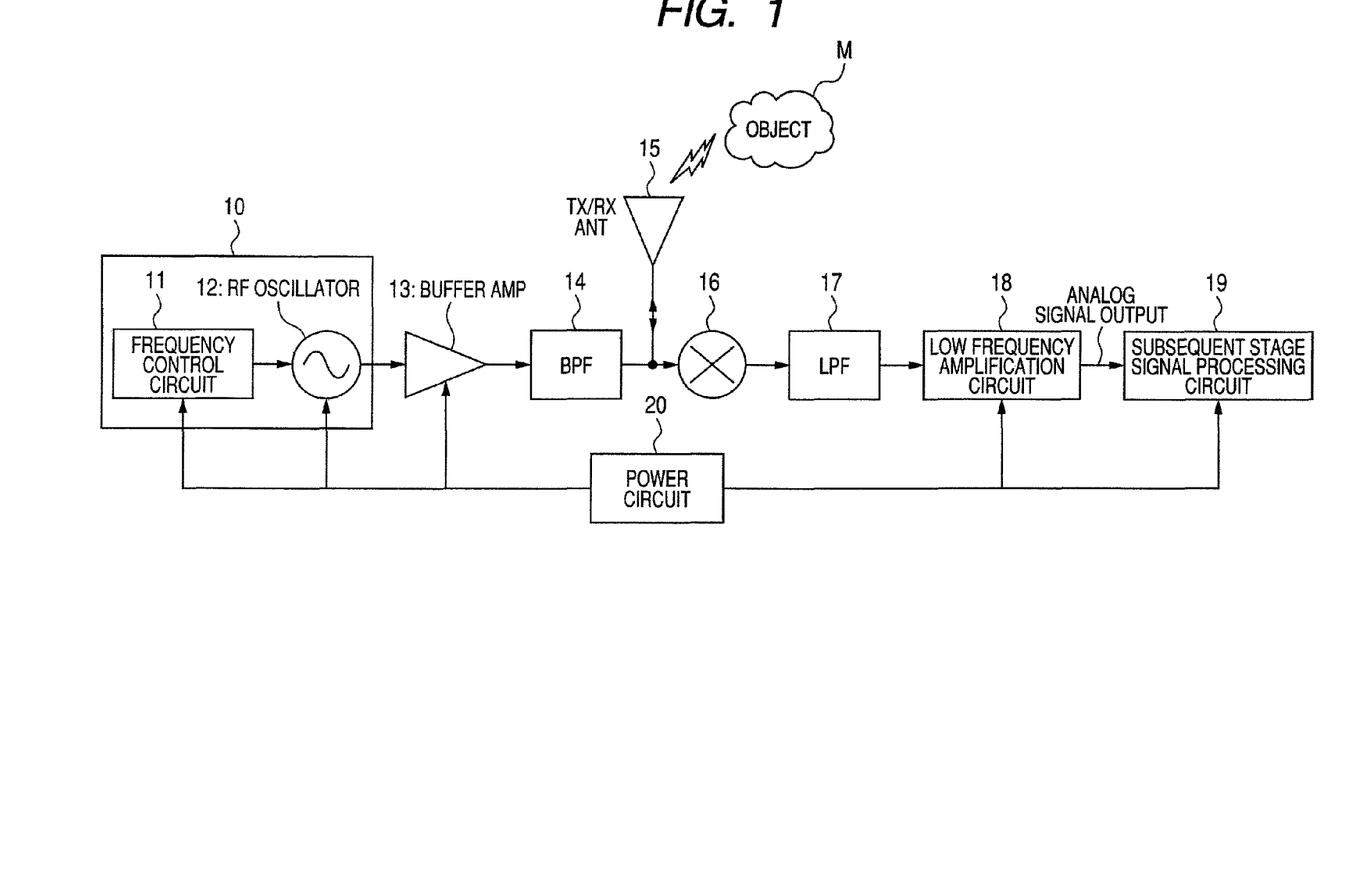
FIG. 1 is a functional block diagram of a wireless sensor device in accordance with the embodiment of the present disclosure.

FIG. 1 is a functional block diagram of the wireless sensor device in accordance with the embodiment.

The wireless sensor device in accordance with the embodiment includes a transmission signal generation unit 10 that generates a frequency-spread high frequency transmission signal by continuously changing a frequency with a predetermined period (e.g., 2 µs) in a frequency range centering on a frequency band used (e.g., 2.4 GHz). The transmission signal generation unit 10 includes a frequency control circuit 11 and an RF oscillator 12. The frequency control circuit 11 generates a control voltage signal, in which voltage variation is repeated in a chopping wave shape, according to frequency variation in the high frequency transmission signal. The RF oscillator 12 has an oscillation frequency controlled by the control voltage signal supplied from the frequency control circuit 11, and outputs the high frequency transmission signal, which has a frequency spread after being changed in the chopping wave shape, as an oscillation signal. A buffer amplifier 13 and a bandpass filter 14 are serially connected to an output terminal of the RF oscillator 12. The buffer amplifier 13 amplifies the high frequency transmission signal output from the RF oscillator 12 to a radiatable level. The bandpass filter 14 sets a frequency variation range (range in which the frequency is changed in the chopping wave shape) of the high frequency transmission signal, which is output from the RF oscillator 12, as a pass band. A transceiver antenna 15 radiates the transmission signal, which is input from the transmission side, through the air as a radio wave. The output terminal of the bandpass filter 14 is connected to a power feeding part of the antenna 15. The bandpass filter 14 may be connected to the power feeding part of the transceiver antenna 15 through a directional coupler, or may be directly connected thereto. The antenna 15 radiates the high frequency transmission signal with the frequency changed in the chopping wave shape. The antenna 15 may use a directional antenna, which allows the radiation direction of the high frequency transmission signal to be in a predetermined direction (a detection area where an object exists). However, the antenna 15 may be a non-directional antenna according to specifications (use purpose, accuracy). Furthermore, in the embodiment, the antenna 15 is used as a transmitter antenna and a receiver antenna. However, the transmitter antenna and the receiver antenna may be separately provided.

The wireless sensor device in accordance with the embodiment includes a mixer circuit 16 as an element of the reception side. The mixer circuit 16 receives the high frequency transmission signal with the frequency changed in the chopping wave shape from the transmission side as a first input signal, and receives a high frequency reception signal with a frequency changed in the chopping wave shape from the antenna 15, which serves as the reception side, as a second input signal. The mixer circuit 16 outputs a frequency-converted signal by mixing the first input signal with the second input signal. However, when the frequencies of the first input signal and the second input signal coincide with each other, the mixer circuit 16 serves as a phase detector. That is, when the frequencies of the first input signal and the second input signal coincide with each other, the mixer circuit 16 outputs a DC beat (a DC signal) according to the phase difference between the first input signal and the second input signal.

A low-pass filter (LPF) 17 is connected to the output terminal of the mixer circuit 16. The low-pass filter 17 is set to have pass band characteristics for extracting a low frequency component (e.g., a frequency component equal to or less than 100 Hz) so as to serve as a DC extraction circuit. While the frequencies of the first input signal and the second input signal differ from each other, signals with various frequencies (high frequency and intermediate frequency) after frequency conversion are output from the mixer circuit 16, but are suppressed by the low-pass filter 17. The DC beat output from the mixer circuit 16 when the frequencies of the first input signal and the second input signal coincide with each other is extracted by the low-pass filter 17.

A low frequency amplification circuit 18 is connected to the output terminal of the low-pass filter 17. The low frequency amplification circuit 18 amplifies the DC beat, which is extracted by the low-pass filter 17, to a level which can be processed by a subsequent stage circuit. A subsequent stage signal processing circuit 19 includes a CPU, a memory, programs executed by the CPU, and the like, and has a function of detecting the motion of the object M and the distance to the object M by analyzing the low frequency component (including the DC component) output from the mixer circuit 16.

In addition, power is supplied from a power source circuit 20 to elements 11, 12, 13, 18 and 19 of the transmission side and the reception side, which require power.

Figure 2:
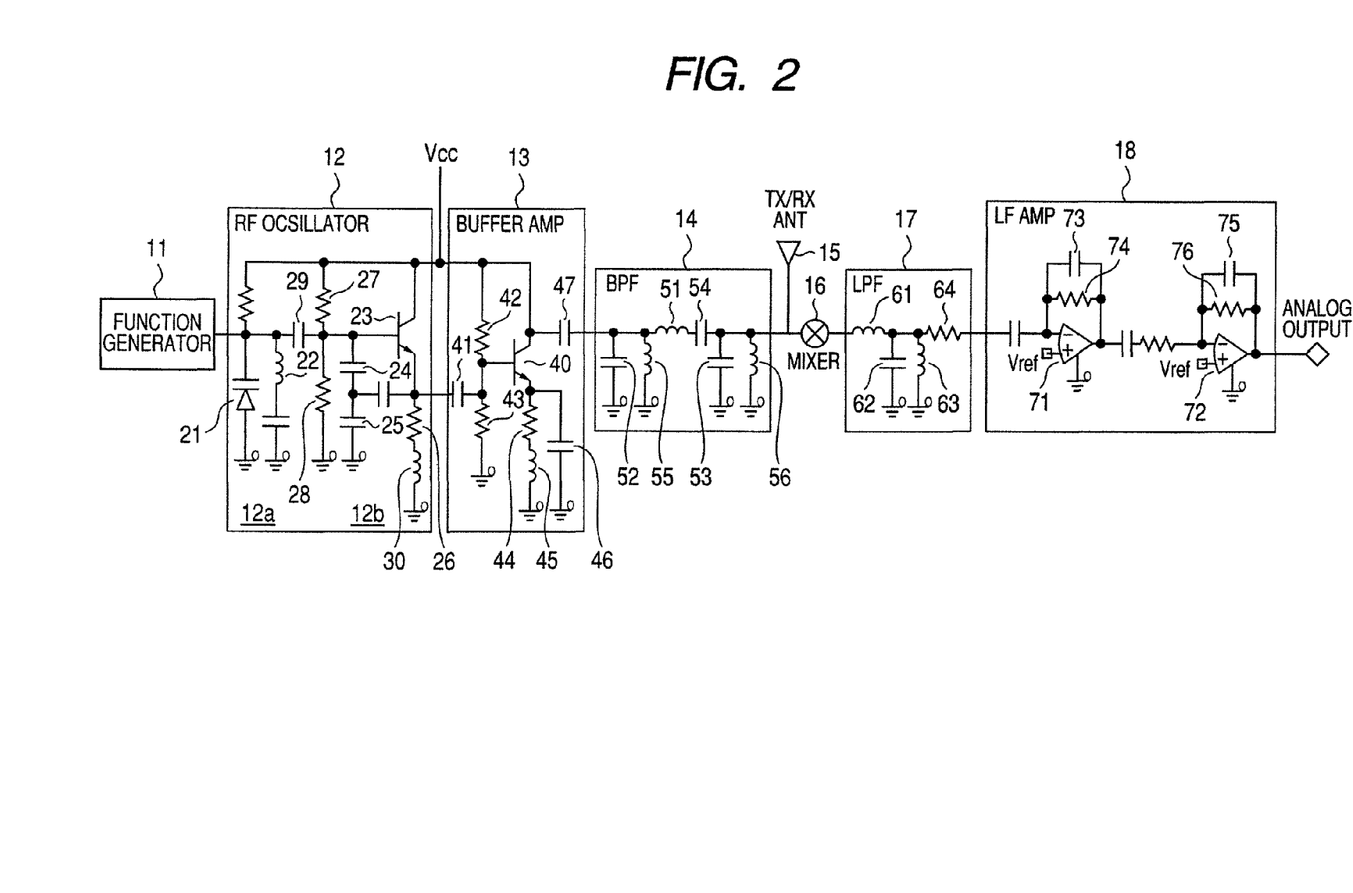
FIG. 2 is a circuit configuration diagram of a wireless sensor device shown in FIG. 1.

FIG. 2 is a diagram showing an example of a circuit configuration of the wireless sensor device. The circuit configuration shown in FIG. 2 is an example for realizing the above-described elements, and the disclosure is not limited to the circuit configuration shown in FIG. 2.

The frequency control circuit 11 includes a function generator capable of generating a predetermined waveform. In the embodiment, the function generator generates a voltage signal with an amplitude that periodically increases and decreases. In the following description, the function generator generates a voltage signal having a repeated chopping wave.

The RF oscillator 12 includes a resonant circuit part 12a and an oscillation circuit part 12b. The resonant circuit part 12a receives the voltage signal of the chopping wave, which is generated by the frequency control circuit 11, as a control voltage signal. The oscillation circuit part 12b oscillates with a resonant frequency generated by the resonant circuit part 12a.

The resonant circuit part 12a includes an LC parallel resonant circuit having a varactor diode 21 as a variable capacitance element and an inductor 22. The control voltage signal of the chopping wave is applied to a cathode of the varactor diode 21. The resonant frequency of the resonant circuit part 12a is changed in the chopping wave according to variation in the capacitance of the varactor diode 21.

The oscillation circuit part 12b includes a transistor 23 as an oscillation element, capacitors 24 and 25 as a voltage divider, an emitter bias resistor 26, and voltage division resistors 27 and 28 for a base bias. An emitter of the transistor 23 is coupled to an intermediate connection point of the capacitors 24 and 25 for voltage division, and a collector and a base of the transistor 23 are coupled to each other through the inductor 22 and a capacitor 29 of the resonant circuit part 12a. A driving voltage Vcc supplied from the power source circuit 20 is applied to the collector of the transistor 23, and is applied to the base of the transistor 23 after being divided by the voltage division resistors 27 and 28. The emitter bias resistor 26 is grounded through an inductor 30 for high frequency interruption.

In the RF oscillator 12 configured as mentioned above, since the resonant frequency of the transistor 23 is determined by the resonant frequency of the resonant circuit part 12a, if the resonant frequency of the resonant circuit part 12a is changed while drawing the chopping wave, the oscillation frequency is also changed while drawing the chopping wave. An oscillation signal generated by the oscillation circuit part 12b is extracted from the emitter of the transistor 23 as the high frequency transmission signal.

In addition, in the RF oscillator 12 shown in FIG. 2, the oscillation frequency of the oscillation circuit part 12b is controlled by the resonant circuit part 12a including the variable capacitance element 21. However, it may be possible to provide a configuration in which the control voltage signal of the chopping wave shape is directly applied to the base of the transistor 23 without providing the resonant circuit part 12a. The capacitance of a PN junction part of the transistor 23 is changed by the control voltage signal applied to the base thereof, so that the oscillation frequency is changed according to variation in the voltage of the control voltage signal.

The buffer amplifier 13 includes a transistor 40 as a high frequency amplification element. The emitter of the transistor 23 of the oscillation circuit part 12b is connected to a base of the transistor 40 through a capacitor 41. In the transistor 40, the supply voltage Vcc is applied as a collector bias, and a voltage obtained by dividing the supply voltage Vcc by voltage division resistors 42 and 43 is applied as a base bias. An emitter of the transistor 40 is grounded in a DC manner through an emitter bias resistor 44 and an inductance 45 while being grounded in a high frequency manner through a capacitor 46. The high frequency transmission signal with the oscillation frequency changed while drawing the chopping wave is extracted from a collector of the transistor 40.

The bandpass filter 14 includes a combination of a π type low-pass filter including an inductor 51 and capacitors 52 and 53, and a π type high-pass filter including a capacitor 54 serially connected to the inductor 51, and inductors 55 and 56. A pass band of the bandpass filter 14 is set to have a variable range (the height of the chopping wave) of the oscillation frequency of the high frequency transmission signal.

The mixer circuit 16 uses a passive mixer that performs frequency conversion by using non-linear characteristics of a passive element such as a Schottky diode. For example, the mixer circuit 16 may use a double-balanced mixer. However, the present disclosure is not limited to the double-balanced mixer. For example, when the frequencies of the first input signal and the second input signal coincide with each other, a balanced mixer and a single-ended mixer may also be used if they serve as a phase detector capable of detecting the phase of a synthesis signal of the first input signal and the second input signal, in addition to the double-balanced mixer.

The low-pass filter 17 includes an inductor 61, a capacitor 62, and an inductor 63. The inductor 61 has one end connected to an output terminal of the mixer circuit 16. The capacitor 62 is connected between the other end of the inductor 61 and a ground. The inductor 63 is connected in parallel to the capacitor 62. The frequency characteristics of the low-pass filter 17 are set to be suitable for extracting the DC beat which is output when the mixer circuit 16 operates as the phase detector (the frequencies of the high frequency transmission signal and the high frequency reception signal, which are mixed with each other, coincide with each other).

The low frequency amplification circuit 18 includes a multi-stage configuration of two OP amplifiers 71 and 72. A capacitor 73 and a feedback resistor 74 are connected between an output terminal and an inversion input terminal of the OP amplifier 71, and a capacitor 75 and a feedback resistor 76 are connected between an output terminal and an inversion input terminal of the OP amplifier 72. The potential difference between the inversion input terminal and a non-inversion input terminal of the OP amplifier 71, and the potential difference between the inversion input terminal and a non-inversion input terminal of the OP amplifier 72 are actually zero (i.e., imaginary short). Each of the OP amplifiers 71 and 72 low-frequency amplifies an input signal (the DC beat), which is applied to the input terminal thereof, and outputs the amplified signal to the output terminal thereof.

Next, the operation of the wireless sensor device configured as mentioned above in accordance with the embodiment will be described.

The control voltage signal of the chopping wave is applied to the resonant circuit part 12a of the RF oscillator 12 from the frequency control circuit 11. The capacitance of the varactor diode 21 of the resonant circuit part 12a is changed in the chopping wave in response to the control voltage signal of the chopping wave. An RF resonant frequency generated by the RF oscillator 12 including the resonant circuit part 12a and the oscillation circuit part 12b is modulated into the chopping wave, resulting in the generation of a chopping wave FM modulation RF signal. The chopping wave FM modulation RF signal generated in this way is amplified by the buffer amplifier 13, and is radiated from the antenna 15 as the high frequency transmission signal after passing through the bandpass filter 14.

Figure 3A:
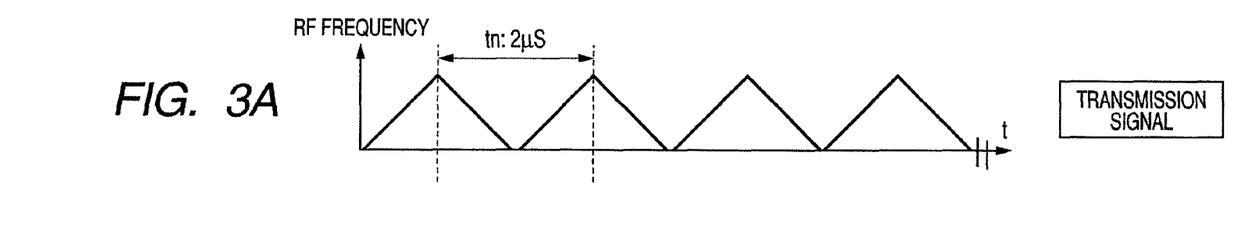
FIG. 3A is a diagram showing a frequency waveform of a high frequency transmission signal radiated from an antenna.

FIG. 3A is a diagram showing variation in the frequency of the high frequency transmission signal radiated from the antenna 15. In FIG. 3A, a vertical axis denotes a frequency and a horizontal axis denotes a time. The frequency of the high frequency transmission signal is repeatedly increased and decreased in a linear manner with a predetermined period to (2 μs) so as to form the chopping wave. The high frequency transmission signal with the frequency changed in the chopping wave is radiated from the antenna 15.

When an object M is located at a place spaced apart from the antenna 15 by a predetermined distance, a reflected wave from the object M is received in the antenna 15. The reflected wave received in the antenna 15 suffers from time delay and amplitude attenuation during signal transmission. However, basically, the frequency of the reflected wave is changed in the chopping wave shape with a period the same as that of the high frequency transmission signal.

Figure 3B:
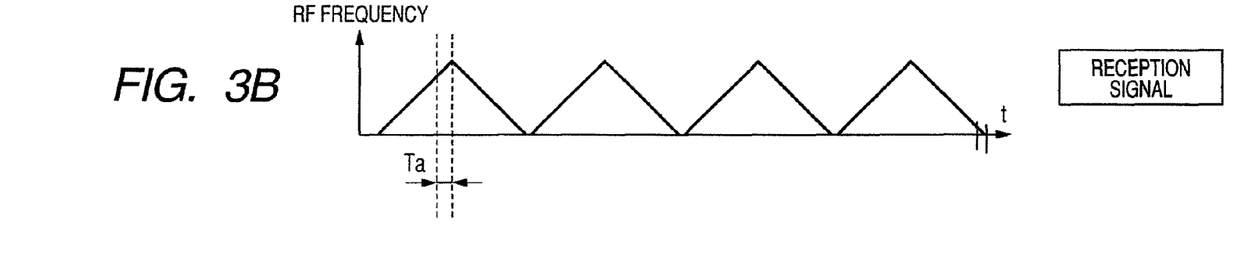
FIG. 3B is a diagram showing a frequency waveform of a high frequency reception signal output from an antenna having received a reflected wave.

FIG. 3B is a diagram showing variation in the frequency of the high frequency reception signal output from the antenna 15 having received the reflected wave. The high frequency reception signal is shown on a time axis (horizontal axis) the same as the time axis on which the high frequency transmission signal is shown in FIG. 3A. The phase of the high frequency reception signal is shifted by a time Ta due to the time delay during the signal transmission as compared with the high frequency transmission signal. For example, when the distance from the antenna 15 to the object M is 1 m, reciprocal time delay Ta is about 6.67 nS. When the object M is in a stationary state, the time delay Ta is constant because frequency shift due to the Doppler phenomenon does not occur. Meanwhile, when the object M is moving, the time delay Ta is changed because the frequency shift due to the Doppler phenomenon and distance variation occur. The subsequent stage signal processing circuit 19 determines the presence or absence of the motion of the object M from the variation in the time delay Ta measured from the DC beat serving as the output of the mixer circuit 16, which will be described later.

Figure 4:
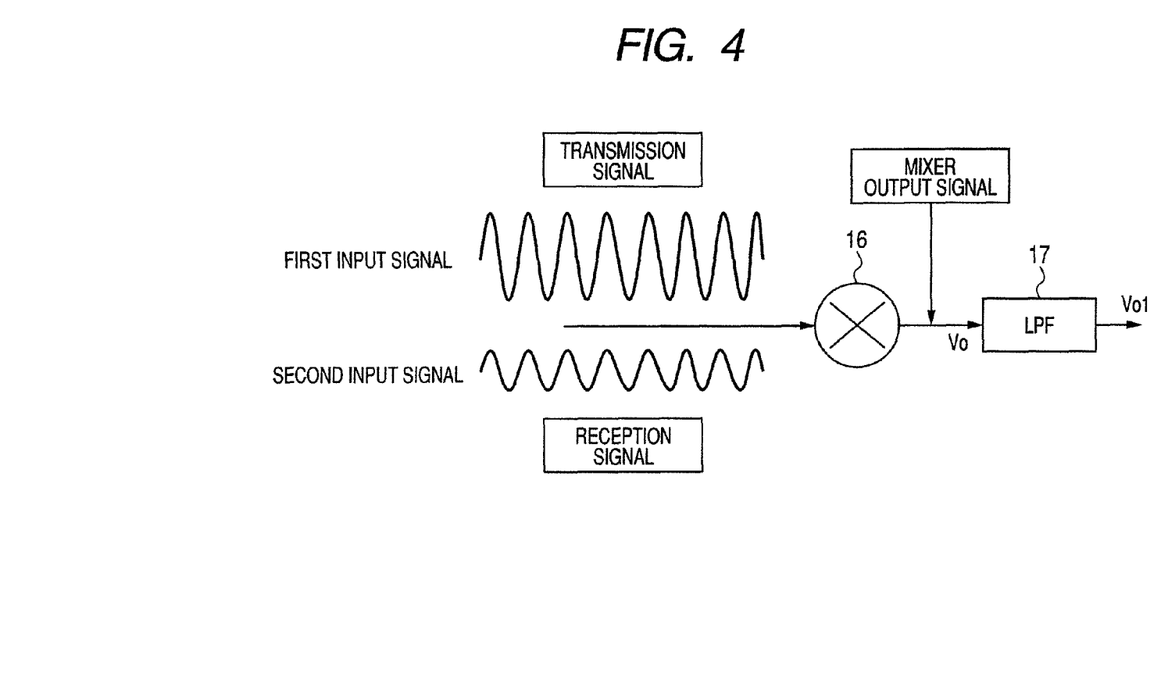
FIG. 4 is a diagram schematically showing input/output to/from a mixer circuit.

A part of the high frequency transmission signal radiated from the antenna 15 and the high frequency reception signal serving as the reflected wave of the high frequency transmission signal are input to the mixer circuit 16. Thus, the high frequency transmission signal having the above-described phase difference and the high frequency reception signal are input to the mixer circuit 16 as the first input signal and the second input signal, respectively. FIG. 4 is a diagram schematically showing the configuration in which a mixer output signal Vo obtained by mixing the first input signal with the second input signal in the mixer circuit 16 is input to the low-pass filter 17 and then only the DC component (the low frequency signal) Vo1 is extracted from the mixer output signal Vo.

However, when the frequency of the high frequency transmission signal is 2.45 GHz and the movement speed of the object M is about 30 m/h, the high frequency reception signal suffers from frequency shift of about several hundred Hz due to the Doppler effect. As described above, since the frequency shift due to the Doppler effect is very small compared with the frequency of the high frequency transmission signal, it is necessary to generate an oscillation frequency of a fixed value with very high accuracy from the frequency of a transmission signal according to the related art. That is, since the frequency difference is detected by mixing the high frequency transmission signal with the high frequency reception signal having the shifted frequency by means of a mixer, it is necessary to obtain the accuracy suitable for detecting the frequency difference of about several hundred Hz by synthesizing the signals of several GHz bands.

In the embodiment, since the frequency of the high frequency transmission signal is repeatedly increased and decreased in the chopping wave shape as shown in FIG. 3A, the frequency of the high frequency reception signal serving as the reflected wave of the high frequency transmission signal is also repeatedly increased and decreased in the chopping wave shape as shown in FIG. 3B, similarly to the high frequency transmission signal.

Figure 5:
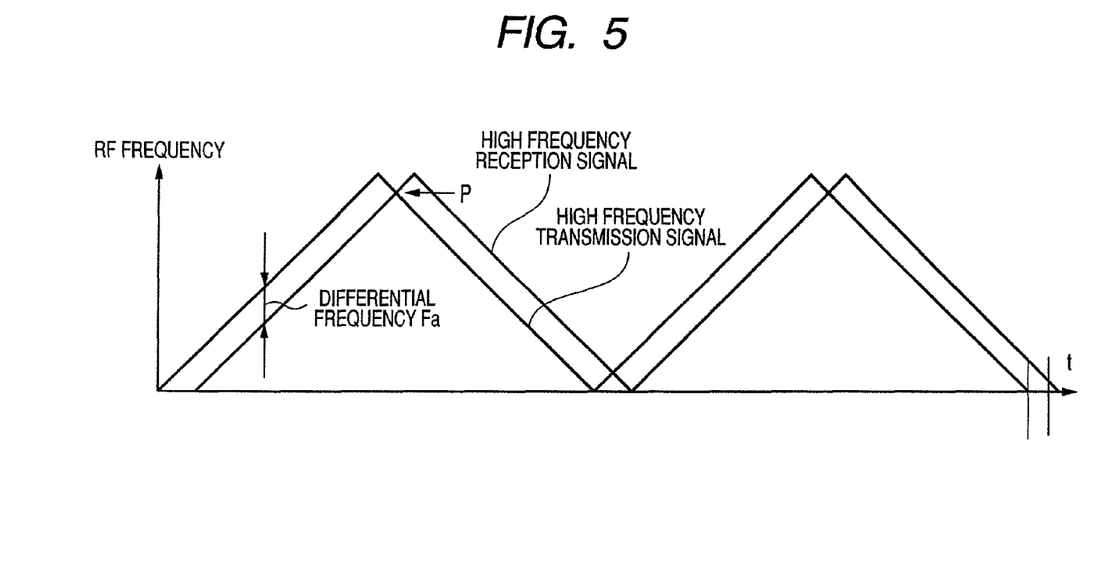
FIG. 5 is a frequency waveform diagram showing the overlapping of a high frequency transmission signal and a high frequency reception signal which are mixed in a mixer.

FIG. 5 is a diagram showing the overlap of the high frequency transmission signal and the high frequency reception signal, which are mixed in the mixer circuit 16. As shown in FIG. 5, since the high frequency transmission signal and the high frequency reception signal are chopping waves (frequencies), when the high frequency reception signal is shifted in the time axis direction due to the delay (the distance), the point P, at which the high frequency transmission signal intersects the high frequency reception signal, is necessarily generated every one period.

The present inventor has paid attention to the fact that if a mixing component of the high frequency transmission signal and the high frequency reception signal is detected at the point P at which the high frequency transmission signal of the chopping wave (frequency) intersects the high frequency reception signal of the chopping wave (frequency), it is possible to detect a residual phase serving as the delay phase difference between the high frequency transmission signal and the high frequency reception signal, which have the same frequency. That is, when the first input signal and the second input signal, which have the same frequency, are synthesized with each other, the signal synthesis output comes to have a signal waveform corresponding to the phase difference between the first input signal and the second input signal. Thus, the signal synthesis output of the first input signal and the second input signal includes phase difference information of the two input signals.

The residual phase includes information regarding reciprocal delay (reciprocal distance) of the signal reciprocating between the antenna 15 and the object M. When variation in the position of the object M occurs, the residual phase also changes, resulting in a change in the phase detector output (the DC beat of the mixer circuit 16 operating as the phase detector).

When using a chopping wave with a frequency repeatedly increased and decreased in a linear manner or a frequency waveform with a frequency repeatedly increased and decreased in a curved manner, it may be possible to allow a high frequency transmission signal to easily intersect a high frequency reception signal, thereby enabling the simple and reliable detection of a point at which the high frequency transmission signal and the high frequency reception signal have the same frequency. Furthermore, in the case of a mixer including a non-linear passive element such as a Schottky diode, when two input signals have the same frequency, the mixer operates as a phase detector. Thus, when the output signal of the mixer circuit 16 is input to the low-pass filter 17, the DC beat which is output when the mixer circuit 16 operates as the phase detector can be extracted by the low-pass filter 17. The cut-off frequency of the low-pass filter 17, for example, may be set to 100 Hz.

The DC beat which is output when the mixer circuit 16 operates as the phase detector is extracted by the low-pass filter 17, is low-frequency amplified by the low frequency amplification circuit 18, and then is input to the subsequent stage signal processing circuit 19.

Since the output level of the phase detector (the mixer circuit 16) changes according to changes in the position of the object M, the subsequent stage signal processing circuit 19 can determine that the object M is moving when the output level of the phase detector changes.

Furthermore, since the residual phase is a linear function with respect to the distance, the subsequent stage signal processing circuit 19 may perform linear detection of position transition through linear detection of phase transition. In addition, whenever the distance changes by λ/2, since the phase changes by 360°, one pulse is generated with an output voltage every λ/2, so that it is possible to measure a movement distance with the accuracy of λ/2 by using a pulse counter.

Moreover, as shown in FIG. 5, a differential frequency Fa is generated at points other than the point P at which the frequency of the high frequency transmission signal coincide with the frequency of the high frequency reception signal. If the time domain between the peaks (upper and lower sides) of both chopping waves is removed, the differential frequency Fa has a constant value. However, the differential frequency Fa is generated due to signal delay. In other words, a distance correspondence table between the differential frequency Fa and the distance may be prepared in advance.

For example, if the differential frequency Fa is 200 kHz, the differential frequency Fa is cut-off by the low-pass filter 17. Then, the differential frequency signal output from the mixer circuit 16 in correspondence with the differential frequency Fa is extracted through a route bypassing the low-pass filter 17, and then is input to the subsequent stage signal processing circuit 19. The subsequent stage signal processing circuit 19 can specify a differential frequency from the differential frequency signal, and perform distance detection from the specified differential frequency and the distance correspondence table.

It should be understood by those skilled in the art that various modifications, combinations, sub-combinations and alterations may occur depending on design requirements and other factors insofar as they are within the scope of the appended claims or the equivalents thereof.

The present disclosure can be applied to a wireless sensor device for motion detection and distance detection of an object.

What is claimed is:

1. A wireless sensor device comprising:
    a transmission signal generation unit configured to generate a frequency-spread high frequency transmission signal such that a transmission frequency is continuously increased and decreased with a predetermined period;
    a transmitter antenna configured to radiate the high frequency transmission signal generated by the transmission signal generation unit;
    a receiver antenna configured to receive a reflected wave from an object having received the high frequency transmission signal radiated from the transmitter antenna, and output a frequency-spread high frequency reception signal;
    a mixer circuit configured to receive a part of the high frequency transmission signal, which is input to the transmitter antenna, as a first frequency-spread high frequency signal, receive the high frequency reception signal, which is output from the receiver antenna, as a second frequency-spread high frequency signal, and output a DC beat signal by operating as a phase detector when a frequency of the first frequency-spread high frequency signal coincides with a frequency of the second frequency-spread high frequency signal; and
    a DC component extraction circuit configured to extract the DC beat signal from an output signal of the mixer circuit.

2. The wireless sensor device according to claim 1, wherein a distance to the object is detected based on the DC beat signal extracted by the DC component extraction circuit.

3. The wireless sensor device according to claim 1, wherein a motion of the object is detected based on variation in the DC beat signal extracted by the DC component extraction circuit.

4. The wireless sensor device according to claim 1, wherein a frequency of the high frequency transmission signal generated by the transmission signal generation unit is linearly increased and decreased, resulting in a repetition of variation of a chopping wave shape.

5. The wireless sensor device according to claim 1, wherein a frequency of the high frequency transmission signal generated by the transmission signal generation unit is repeatedly increased and decreased in a curved manner.

6. The wireless sensor device according to claim 1, wherein the transmission signal generation unit includes:
    a frequency spread control circuit configured to generate a voltage control signal having a voltage repeatedly increased and decreased with a period equal to a period of a required high frequency transmission signal; and
    an oscillation circuit having an oscillation frequency to be changed according to the control voltage signal applied from the frequency spread control circuit.

7. The wireless sensor device according to claim 6, wherein the oscillation circuit includes a variable capacitance element having capacitance to be changed according to a voltage applied thereto and the oscillation frequency determined by the changed capacitance, and
    the voltage control signal is applied to the variable capacitance element to change the oscillation frequency.

8. The wireless sensor device according to claim 6, wherein the oscillation circuit includes a transistor as an oscillation element, and the voltage control signal is applied to a base of the transistor to change the oscillation frequency.

9. The wireless sensor device according to claim 1, wherein a single antenna serves as the transmitter antenna and the receiver antenna.

10. The wireless sensor device according to claim 1, wherein the high frequency transmission signal has a frequency of about 2,400 MHz to about 2,483.5 MHz.

* * * * *